United States Patent [19]
Meyer et al.

[11] Patent Number: 5,898,529
[45] Date of Patent: Apr. 27, 1999

[54] DEPLOYABLE SPACE-BASED TELESCOPE

[75] Inventors: Wallace W. Meyer; Robert A. Woodruff, both of Boulder, Colo.

[73] Assignee: Ball Aerospace & Technologies, Inc., Boulder, Colo.

[21] Appl. No.: 08/879,740

[22] Filed: Jun. 20, 1997

[51] Int. Cl.⁶ .............. G02B 5/10; G02B 17/02; H01Q 1/08; H01Q 15/20
[52] U.S. Cl. .......... 359/853; 359/859; 359/365; 343/781 P; 343/880; 343/915
[58] Field of Search ................. 359/851, 853, 359/876, 877, 857, 859, 364, 365, 366; 343/781 P, 880, 881, 882, 915

[56] References Cited

U.S. PATENT DOCUMENTS

| | | | |
|---|---|---|---|
| 3,064,534 | 11/1962 | Tumavicus | 359/853 |
| 3,717,879 | 2/1973 | Ganssle | 359/851 |
| 3,850,504 | 11/1974 | Bisbee | 350/65 |
| 4,453,224 | 6/1984 | Crooks, Jr. | 364/525 |
| 4,529,277 | 7/1985 | Gee et al. | 343/915 |
| 4,562,441 | 12/1985 | Beretta et al. | 343/781 P |
| 4,947,825 | 8/1990 | Moriarty | 343/781 P |
| 5,291,333 | 3/1994 | Mills et al. | 359/601 |
| 5,350,137 | 9/1994 | Henley | 244/158 R |
| 5,384,661 | 1/1995 | Geyer et al. | 359/894 |
| 5,485,168 | 1/1996 | Parekh | 343/781 P |

FOREIGN PATENT DOCUMENTS

| | | | |
|---|---|---|---|
| 3603217 | 9/1986 | Germany | G02B 23/02 |
| 717693 | 2/1980 | Russian Federation | G02B 23/00 |
| WO 96/10207 | 4/1996 | WIPO | G02B 23/00 |

*Primary Examiner*—Jon Henry
*Attorney, Agent, or Firm*—Sheridan Ross P.C.

[57] ABSTRACT

A large aperture light-weight space borne telescope is provided which may be launched by a relatively small launch vehicle. A 6 to 8 meter primary telescope composed of, e.g., 30 segments arranged in two concentric rings is provided. Supplemental outer mirror segments are stowed behind and substantially perpendicular to the main mirror which is usable in the absence of supplemental mirror deployment. Deployment of outer mirrors segments provides a large aperture telescope with a large field of view. Other deployable components include a secondary mirror, a bus, deployable with respect to the optics portion, and one or more sun shade sheets or panels.

38 Claims, 11 Drawing Sheets

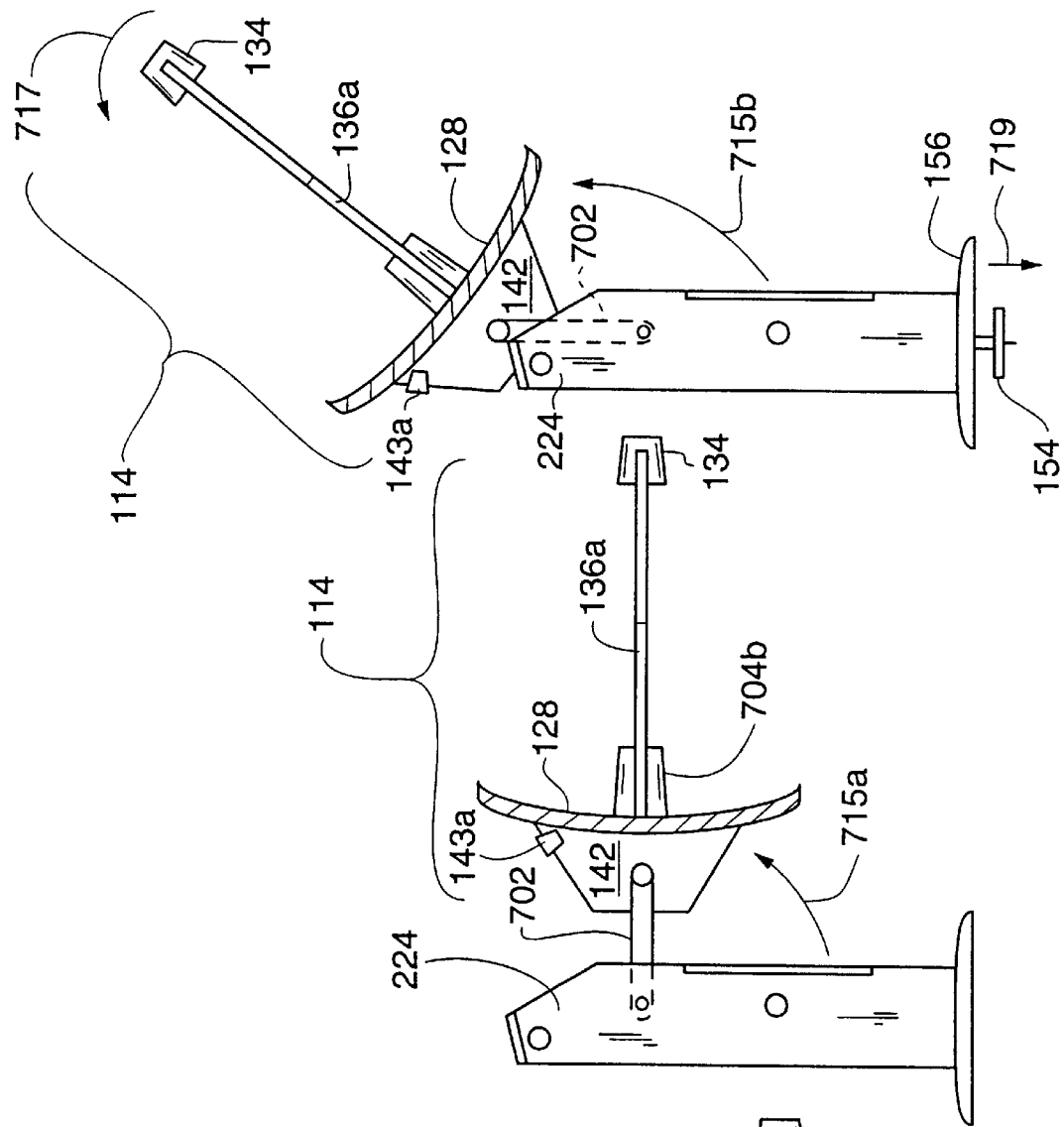

DEPLOYABLE SPACE-BASED TELESCOPE

The present invention relates to a large aperture, space-based deployable telescope and in particular to a space-based telescope with a primary optic diameter greater than a payload diameter of a launch vehicle therefor.

BACKGROUND INFORMATION

The success, albeit delayed, of the Hubble Space Telescope has encouraged and inspired work directed to other space-based (such as earth-orbiting) astronomical observatory platforms. Depending on the type of data to be gathered, a telescope with a large diameter primary optic, such as a 6 to 8 meter diameter (or larger) reflector would be particularly useful for astronomical observations. A number of approaches directed to achieving such an observatory have centered around the concept of a visible to infrared, 6 to 8 meter diameter space-based scientific observatory sometimes referred to as the Next Generation Space Telescope (NGST).

Realization of a large diameter space-based astronomical observatory would involve overcoming a number of problems. Launching such an instrument into orbit means that the payload mass of the observatory must be maintained as low as feasible. In some lightweight designs, optical or other components are not self-supporting in an earth gravity environment and thus cannot be fully or easily tested on earth prior to launch.

The volume and shape of payloads or cargo bays available on current launch vehicles places constraints on the size and shape of such an observatory. In general, a design providing a monolithic primary mirror would present significant manufacturing risks and, particularly in combination with a fixed secondary mirror support structure or truss, would require a launch vehicle with a very large interior volume.

Designs which envision a deployable observatory present another set of potential problems. Interest in a large-diameter primary optic typically means that the primary optic would be one of the components which was deployable, particularly if it is desired to avoid the cost of modifying or redesigning launch vehicles. However, in order to achieve a desired optical quality, such a deployable primary optic must, at least in some designs, have its components aligned to a very high degree of precision, such as within about 10 nanometers. Experience dictates that some account should be taken of the possibility of malfunction or failure in the deployment (or other systems). Accordingly, it would be useful to provide a deployable telescope which would avoid the need for a large number of high-precision alignments of components and which would reduce the potential for loss of function in the event of full or partial deployment failure.

These problems are multiplied as the number of components that must be repositioned in order to effect full deployment increases. Accordingly, it would be useful to provide a deployable space-based telescope which reduces or minimizes the number of components which must be moved to achieve full deployment, particularly the number of deployable optical elements.

SUMMARY OF THE INVENTION

According to the present invention, a large diameter space-based deployable telescope is provided with a primary optic having its deployed diameter greater than the maximum interior payload diameter of its launch vehicle.

In one embodiment, a telescope is provided with a primary mirror and a secondary mirror. The primary mirror, when deployed, is substantially circular with a diameter of 6 to 8 meters. During launch, first and second segments of the primary reflector are pivoted approximately perpendicular to, and somewhat behind, the surface of the remainder of the primary mirror. The secondary mirror is pivoted out of the optical axis, and nearly perpendicular (at about 110 degrees) to the optical axis of the primary mirror, during launch. In this way, deployment is achieved by moving only three components: pivoting the secondary mirror into alignment with the optical axis and pivoting the two folded-back primary mirror segments to be contiguous with the remainder of the primary mirror.

Moreover, even in the absence of (or before) deployment of the folded primary mirror segments, the majority (at least 50% and preferably about 65% or more of the aperture) of the primary mirror is available for use and many important mission objectives can be achieved without or before deployment of the primary mirror folded segments.

In one embodiment, further compaction of the observatory for launch involves positioning of the optical components adjacent a mid-region of the bus portion of the observatory. Once launched, the optical components and the bus portion are reconfigured, with respect to one another, to place the optical portion adjacent an end of the bus.

In one embodiment, a sun shield made up of one, or preferably a plurality of, reflective sheets is folded for launch adjacent and substantially parallel to the bus longitudinal axis. After launch, the sheets are deployed, in one embodiment using only a single motor, between the solar panel end of the bus and the telescope optics to assist in achieving a low temperature (low noise) environment for the science sensors, assisting in reducing or eliminating the need for complex and expensive active cooling.

BRIEF DESCRIPTION OF THE DRAWINGS

FIGS. 7A, B, C are side views, partly in cross-section, showing deployment of the bus with respect to the primary mirror;

DETAILED DESCRIPTION OF THE PREFERRED EMBODIMENT

Figure 6:
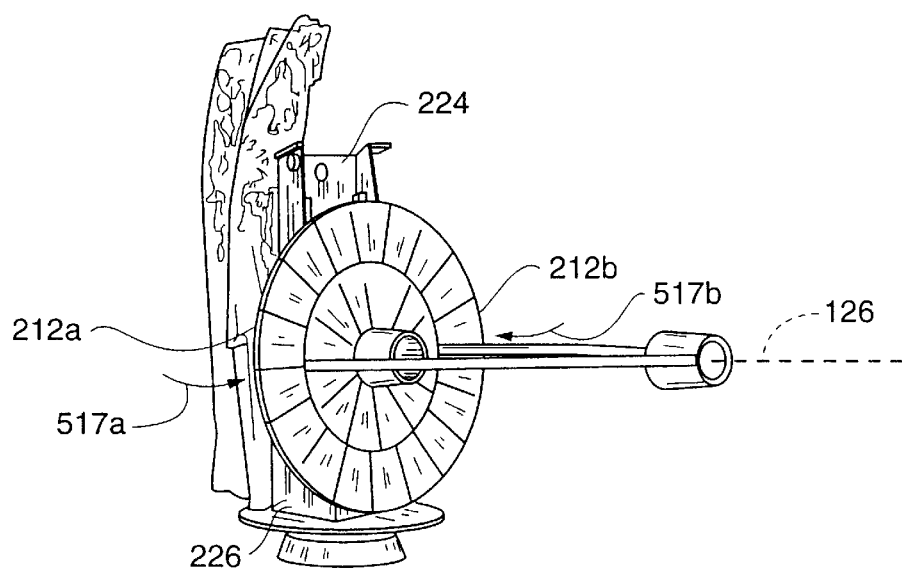
FIG. 6 is a perspective view corresponding to the view of FIG. 5 but showing the primary mirror fully deployed.
Figure 1:
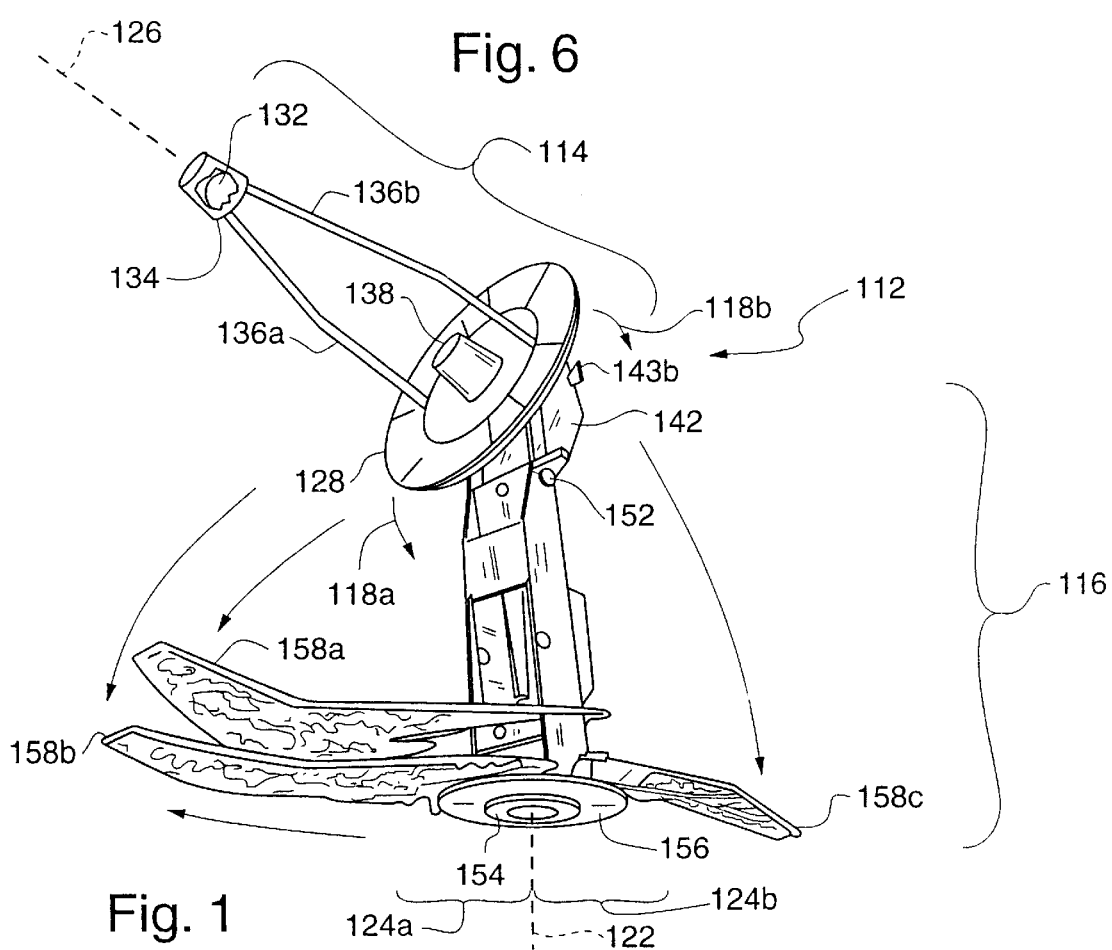
FIG. 1 is a perspective view, partly cut away, of a fully deployed space telescope according to an embodiment of the present invention.

Before describing, specifically, the deployment features of a space telescope, certain components and structures of the space telescope will first be described. As seen in FIG. 1, a space telescope 112 can be considered in terms of the optics portion 114 and the bus portion 116. In general terms, the optics portion 114 obtains images and/or data of astronomical objects and the bus portion 116 maintains orbital attitude, receives and transmits (and, in some cases, processes) data, provides power and cooling, preferably at least partially passive cooling. Preferably, the optical portion 114 is controllably movable, such as being azimuthally pivotable 118a, 118b with respect to the bus 116 which is preferably maintained with its longitudinal axis 122 directed towards the sun. Pivoting 118a, 118b of the optical portion 114, and rotation of the platform as a whole 124a, 124b about the longitudinal axis 122 of the bus can be combined to point the longitudinal axis 126 of the primary mirror 128 in a range of directions for observing selected astronomical objects.

In addition to the primary mirror 128, the optics portion 114 includes a secondary mirror 132, partially covered by a secondary mirror baffle 134 for reducing the influence of stray light coupled in a fixed position with respect to the primary mirror 128 by first and second arms 136a, 136b. The optics portion 114 also includes a primary mirror baffle 138 for reducing stray light and an optics module or science instruments module (SIM) 142 containing tertiary and other mirrors and scientific instrumentation. Small fixed-star detectors 143a, 143b are positioned to assist in navigation and station keeping.

In the depicted embodiment, the primary mirror 128 is made up of a plurality (such as about 30) of contiguous mirror sections 144a–144l, 146a–146r. Each mirror section 144, 146 is approximately one square meter. The sections 144, 146 are arranged to define two concentric annuli. The sections 144a–l of the inner-annulus extend between an inner radius 320 of about 0.5 meters (approximately equal to the radius of the primary mirror baffle 138) and a radius 322 of about 1.75 meters while the segments of the outer annulus 146a–r extend from a radius 322 of about 1.75 meters to a radius 324 of about 6 meters. The mirror sections within each annulus are substantially congruent to one another with each lateral edge 145, 147 defined by a radius of the annuli. A number of mirror curvatures can be used including ellipsoid, other conics or aspherical surfaces. In one embodiment, the reflective surface of the mirror sections together approximately define an ellipsoid of revolution about the optical axis 126.

Although a number of technologies have been developed for producing light-weight scientific-grade mirrors, in one embodiment each mirror section 144, 146 is a beryllium mirror constructed using techniques similar to those used for forming the M2 secondary beryllium mirrors for the Very Large Telescope (VLT) observatory of the European Southern Observatory (ESO). In this way, the experience gained during fabrication of the VLT can be beneficially applied to many aspects of the primary mirror construction of the described space telescope. Preferably, the mirror segments produced in this fashion are self-supporting in normal earth gravity permitting the optics to be fully tested in a normal earth environment, without special supports, prior to launch.

The optics portion 114 is joined to the bus portion 116 by a hinge mechanism 152. In one embodiment, in order to observe particular objects, the optical portion 114 is moved to and retained at desired angles with respect to the bus 116 by e.g., an electric motor 1012 such as a stepper motor.

The bus section 116 includes attitude control devices. Although well-known spacecraft attitude controls can be used, in one embodiment, attitude control is effected or supplemented using hydrogen or helium jets expelling waste from cryogenic hydrogen or helium coolant used for instrumentation cooling in the instrument module 142.

Attitude and other control functions are provided using computers and communication equipment mounted on the bus section 116 in a manner well-known for spacecraft control. A deployable high gain antenna, such as an x-band antenna 154 provides for communication with ground stations (or other communication devices). Power is obtained via a solar panel 156 which is preferably maintained facing the sun.

To achieve a low-temperature, low-noise environment for the optics portion 116 and instrument module 142, despite solar heating, a sun shield made from three deployable reflective sheets 158a,b,c is used.

Figure 2:
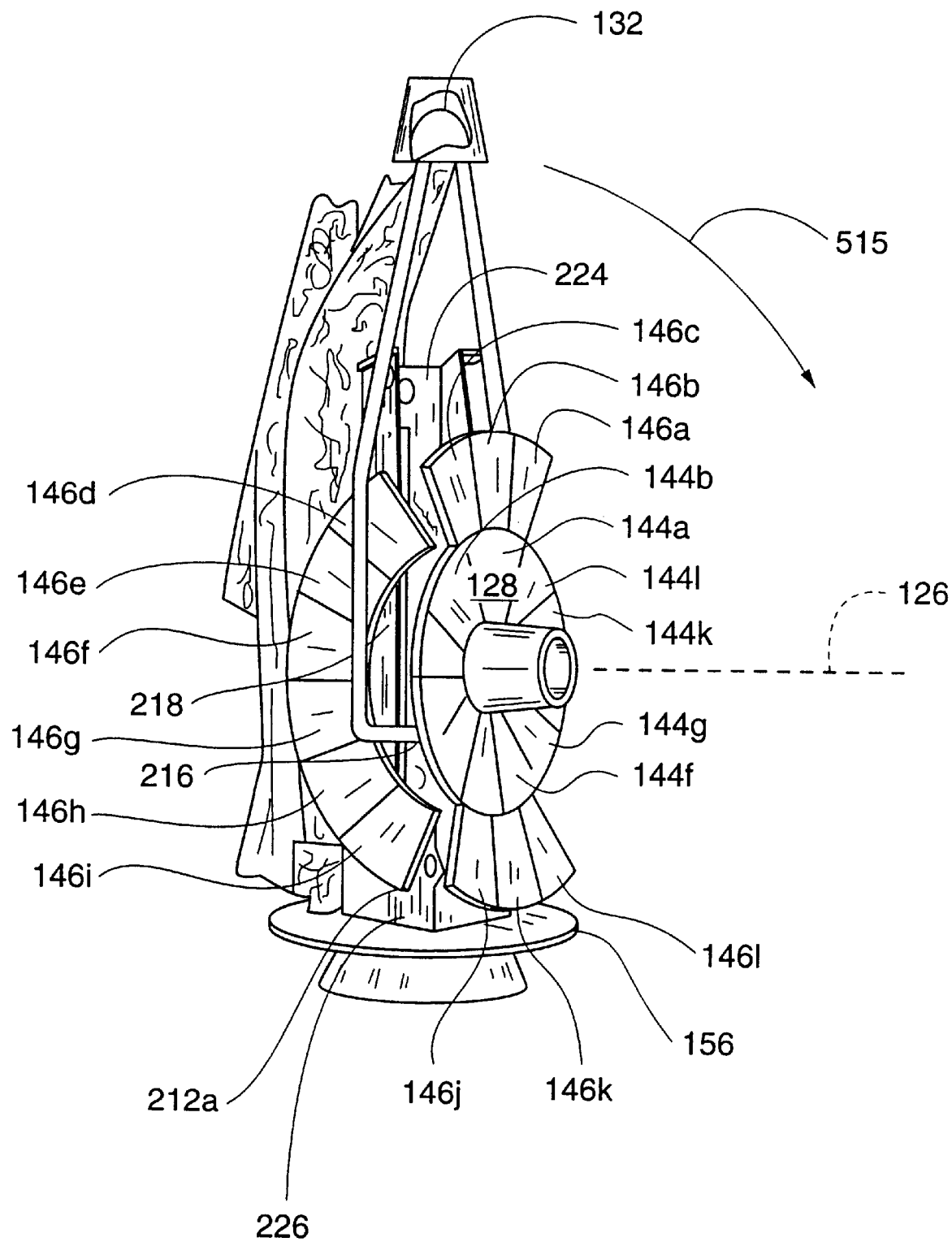
FIG. 2 is a perspective view corresponding to FIG. 1 but showing the telescope undeployed.

FIG. 2 depicts the telescope of FIG. 1 in a folded or launch configuration according to an embodiment of the present invention. As seen in FIG. 2, for launch, first and second side segments 212a, 212b are pivoted to a position defining planes approximately parallel to the optical axis. The secondary mirror 132 and arms 136 are pivoted, for launch, about arm deployment axis 216 so that support arms 136a, 136b are at an angle 218 of about 110 degrees with respect to the optical axis 126 (see FIG. 4). During launch, the optic section 114 is centered approximately midway along the longitudinal axis of the bus portion 116 with the module 142 nested approximately half way between the latching or pivot end 224 of the bus section 116 and the solar end 226 of the bus portion. The secondary mirror arms 136a, 136b and the bus longitudinal axis 122 are nearly (i.e. within about 20 degrees) parallel. The sheets 158a,b,c of the sun shield are positioned substantially parallel to the bus 116 and perpendicular to the optical axis 126 and are also laterally compressed or folded.

Figure 3:
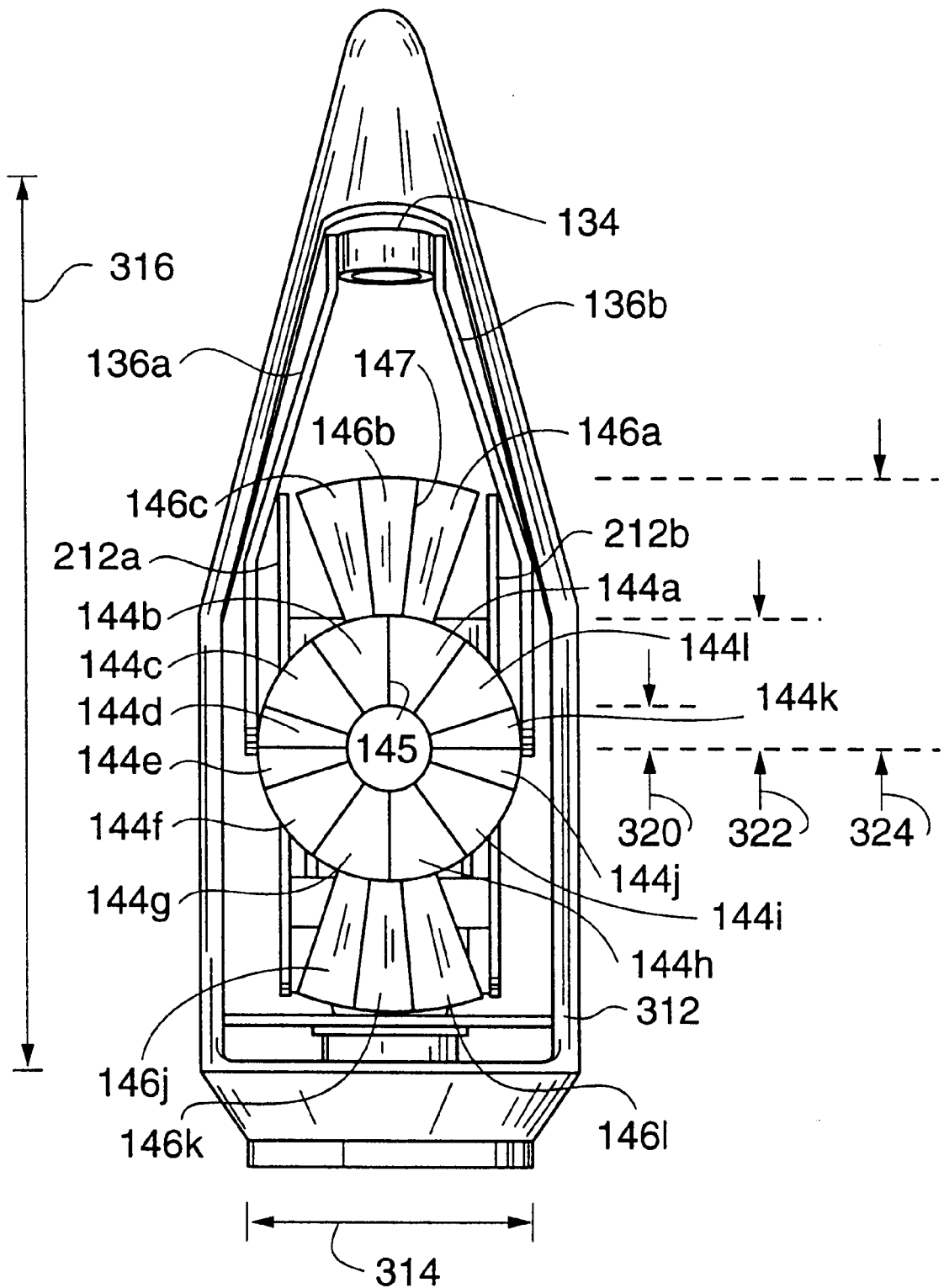
FIG. 3 is a front elevational view, partly cut away, of the undeployed telescope of FIG. 2 positioned in the payload portion of a launch vehicle.
Figure 4:
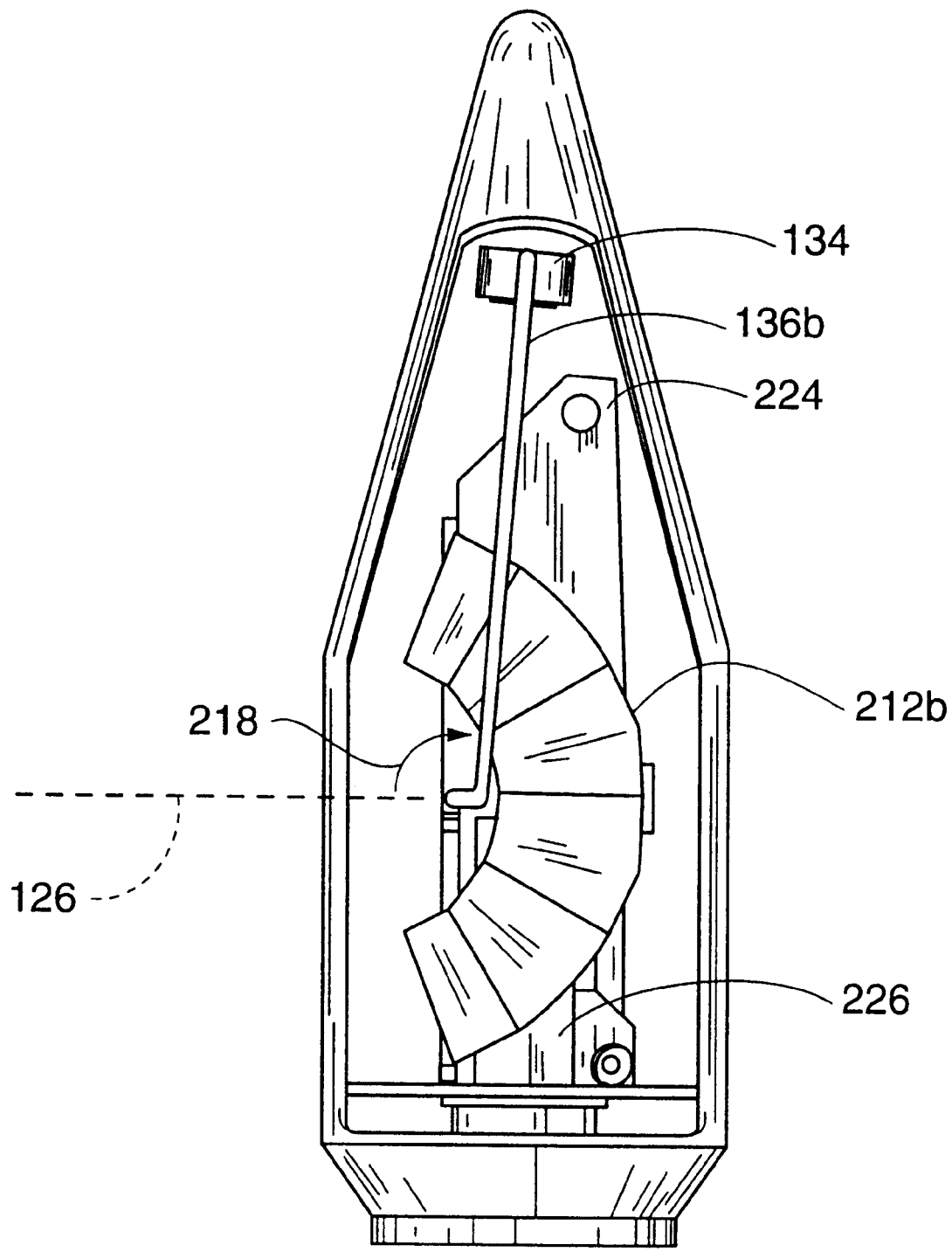
FIG. 4 is a side elevational view, partly cut away corresponding to the front view of FIG. 3.
Figure 5:
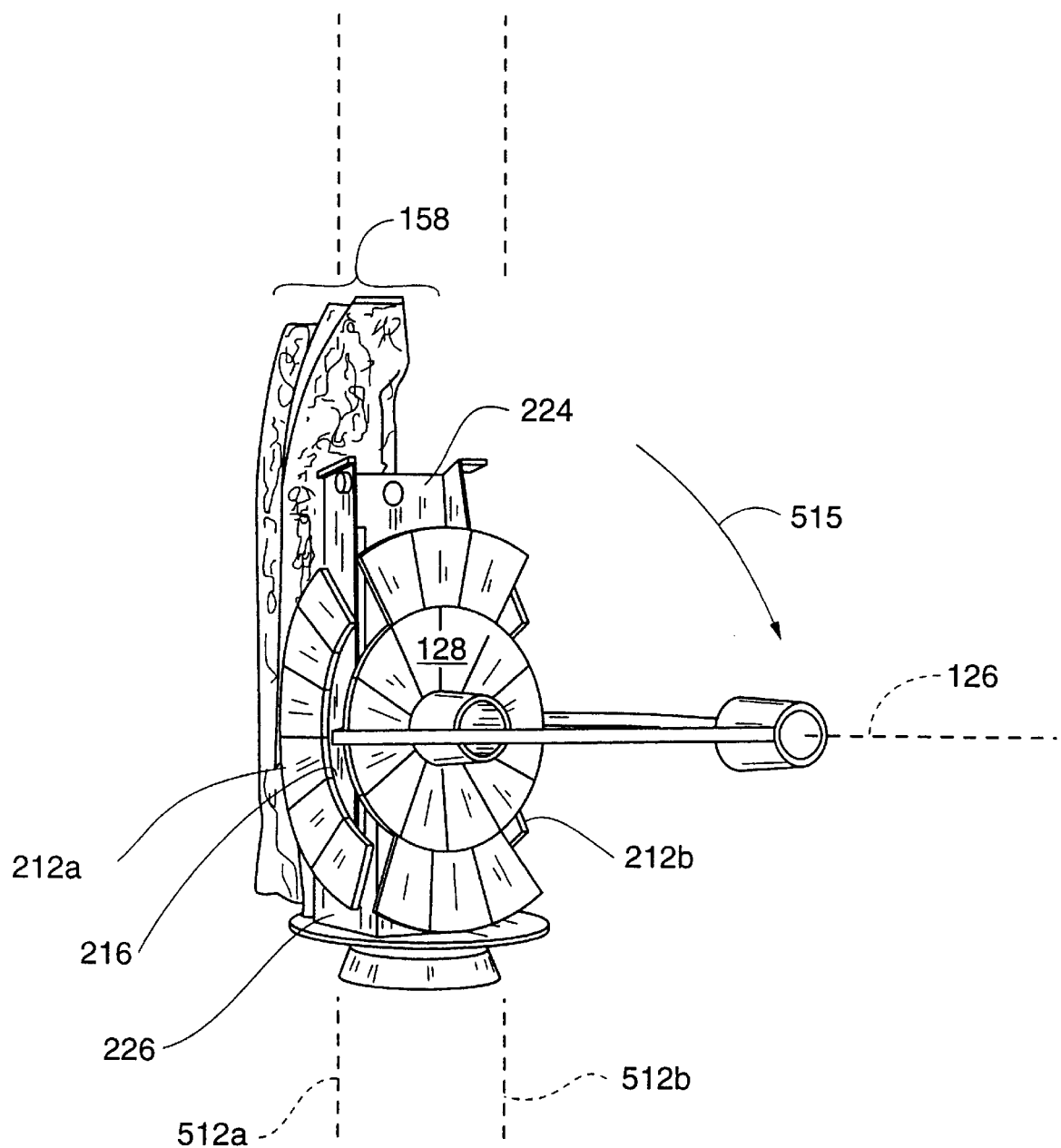
FIG. 5 is a perspective view corresponding to the view of FIG. 2 but showing the secondary mirror deployed.

The folded or launch configuration of FIG. 2 facilitates accommodation of the space telescope within the payload section of the launch vehicle 312 as depicted in FIGS. 3 and 4. In one embodiment, the space telescope is accommodated in the payload section of an Atlas II launch vehicle having a payload diameter 314 of about 3.65 meters and a payload height 316 of about 10.3 meters. As can be seen from FIGS. 3 and 4, in the folded (launch) configuration, the undeployed mirror sections 212a, 212b are positioned so that they do not lie in front of or otherwise obstruct the remaining primary mirror sections 144a–l, 146a–c, 146j through 146l. In this way, even if one or both of the side segments 212a, 212b are undeployed, an operable optical instrument which includes the majority of the mirror segments will be available upon deployment of the secondary mirror 132. Furthermore, the telescope, without deployment of the side segments, can be used to obtain the equivalent of nearly the entire aperture of the deployed instrument by combining an image from the instrument in a first attitude with a second image obtained with the instrument rotated 90 degrees about the optical axis 126.

In the depicted embodiment, the arms 136a, 136b are L-shaped so that the deployed arms 136a, 136b define a plane that passes through the optical axis 126 even though the arm deployment pivot axis 216 is positioned below the optical axis 126. Such configuration of the arms and positioning of the pivot axis 216 assist in fitting the folded telescope within the height 316 of the launch vehicle payload.

FIGS. 5–7 and 1 illustrate the deployment sequence according to an embodiment of the present invention. After release from the shroud of the launch vehicle 312, the secondary mirror arms 136a, 136b are pivoted 515, e.g. via an electric motor 1014, around axis 216 from the position depicted in FIG. 2 to the position depicted in FIG. 5 with the secondary mirror centered along the optical axis 126. The primary mirror side segments 212a, 212b are rotated 517a,b, e.g. via electric motors 1016a, b, about axes 512a, 512b from the configuration depicted in FIG. 5 to the configuration depicted in FIG. 6, contiguous with the remainder of the primary mirror.

In one embodiment, for launch, the optical portion 114 is coupled to the bus 116 in the position depicted in FIG. 2, e.g. by screws 1018, such as six automatically retractable screws. After launch, the screws are retracted 1022 and the optical portion 114 is pivoted 715a,b (FIG. 7A, B, C) via link 702, e.g. using an electric motor 1024 through positions 704a and 704b to couple the optical portion 114 to the coupling end 224 of the bus 116 for pivotal 717 coupling thereto. Preferably the optical portion can pivot up to 180 degrees or more, with the pivot axis near, and preferably passing through, the center of gravity of the optical portion 114.

Figure 9A:
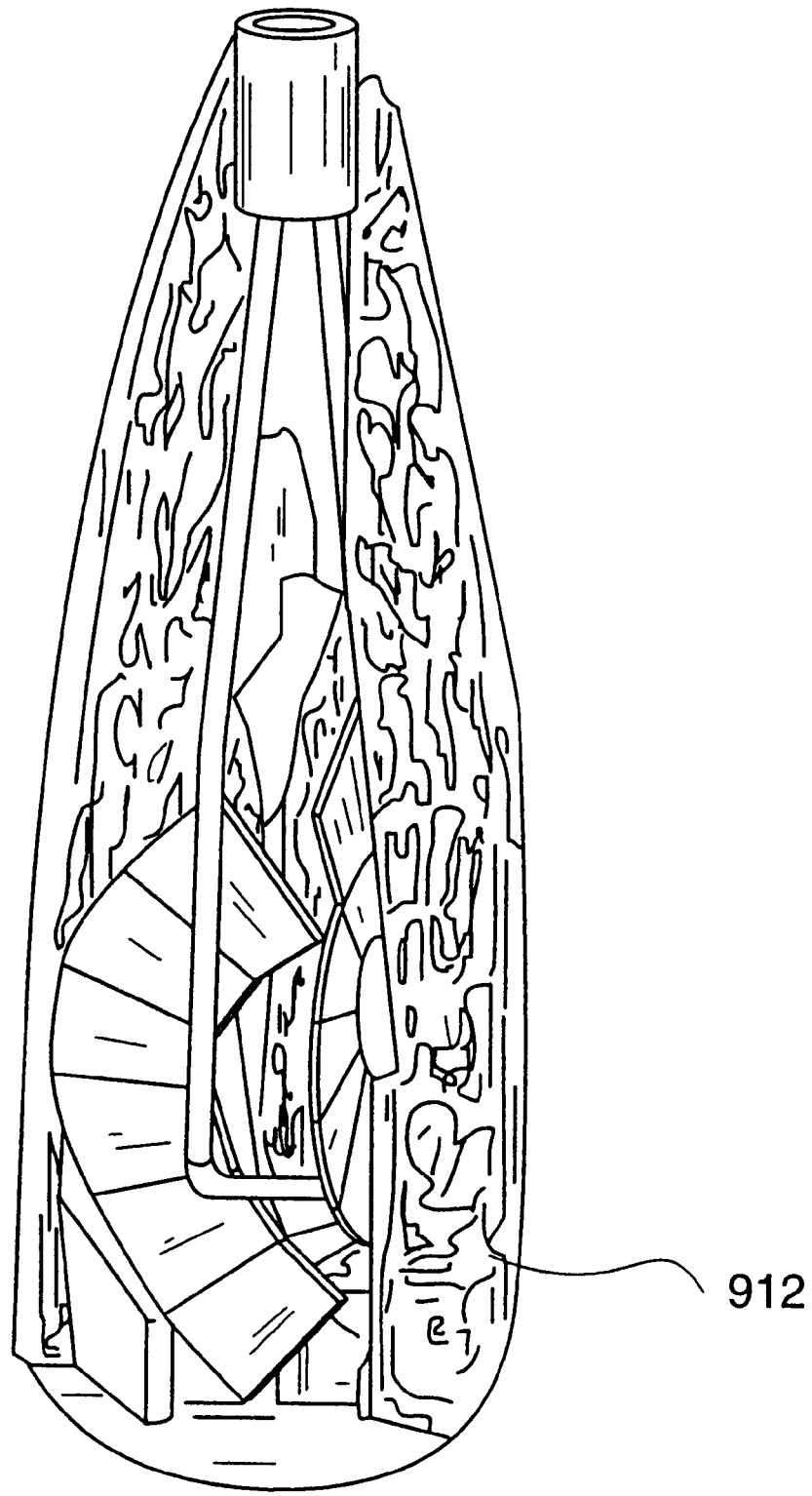
FIGS. 9A–9c depict deployment of the sunshield system according to an embodiment of the present invention.
Figure 9B:
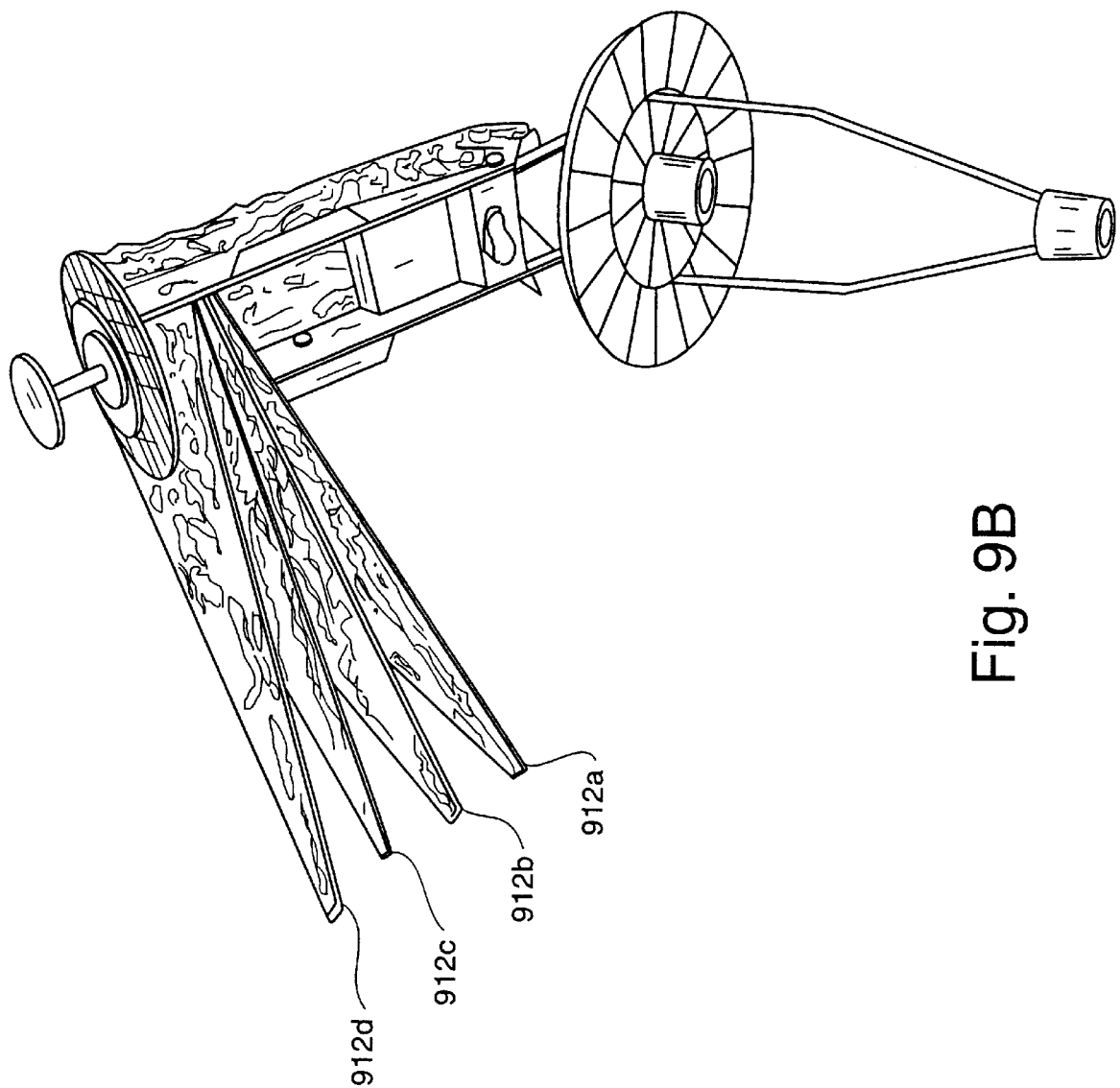
Figure 9C:
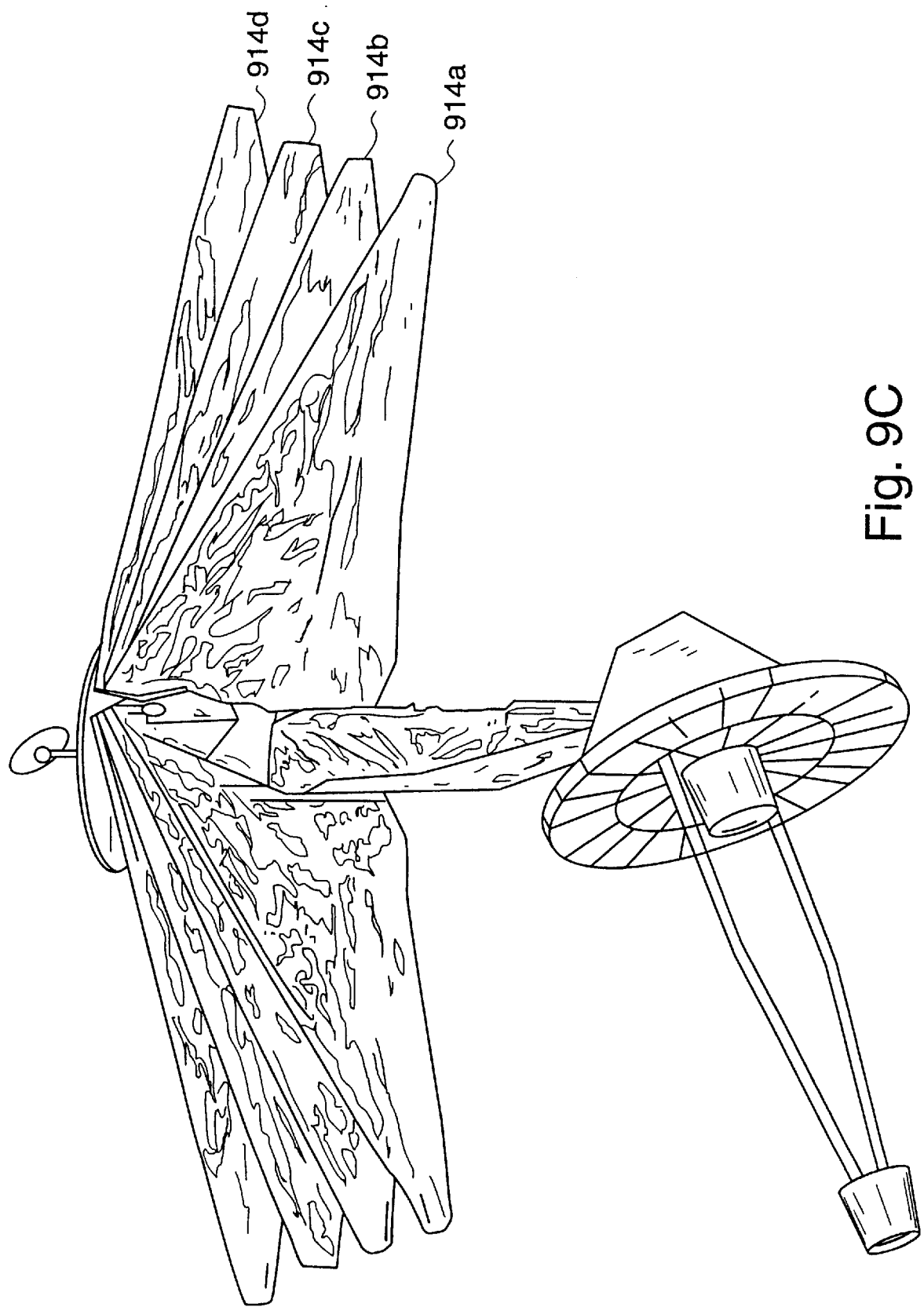
Figure 10:
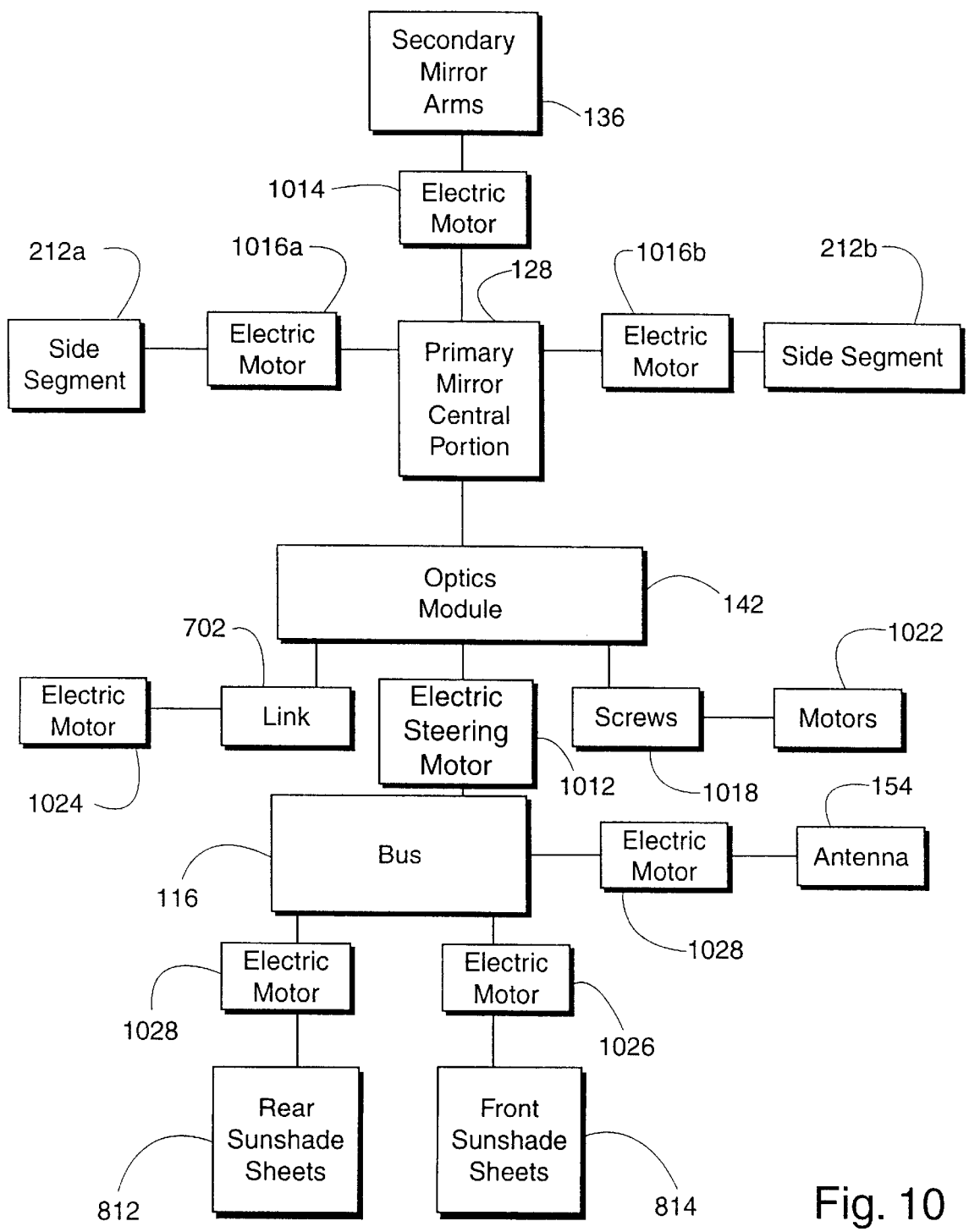
FIG. 10 is a block diagram of certain components of a space telescope according to an embodiment of the present invention.

Deployment of the sunshield sheets is preferably completed after the optical portion is coupled to the end of the bus 116. FIGS. 9A through 9C depict stages in the sunshield deployment in an alternative embodiment in which the sunshield has eight sheets. In this embodiment, the sheets, in the launch configuration are positioned both in front of and behind the main portion of the mirror, as depicted in FIG. 9A, to effectively cocoon the remainder of the telescope. The front sunshield sheets 912 a, b, c, d may be partially deployed before deployment of the secondary mirror 32, to provide clearance for later deployments. In any case, the front sunshield sheets 912a, b, c, d are deployed, e.g. using two actuators, such as electric motors 1026, as depicted in FIG. 9B. The rear sunshields 914a, b, c, d are deployed, e.g. using three actuators such as electric motors 1028, as depicted in FIG. 9C.

The antenna 154 is deployed outward of the solar panel 156 as depicted in FIG. 7C, e.g. via an electric motor 1028, to assume the fully deployed configuration. In one embodiment, the antenna is gimballed so it may be directed other than along the longitudinal axis 122.

Figure 8:
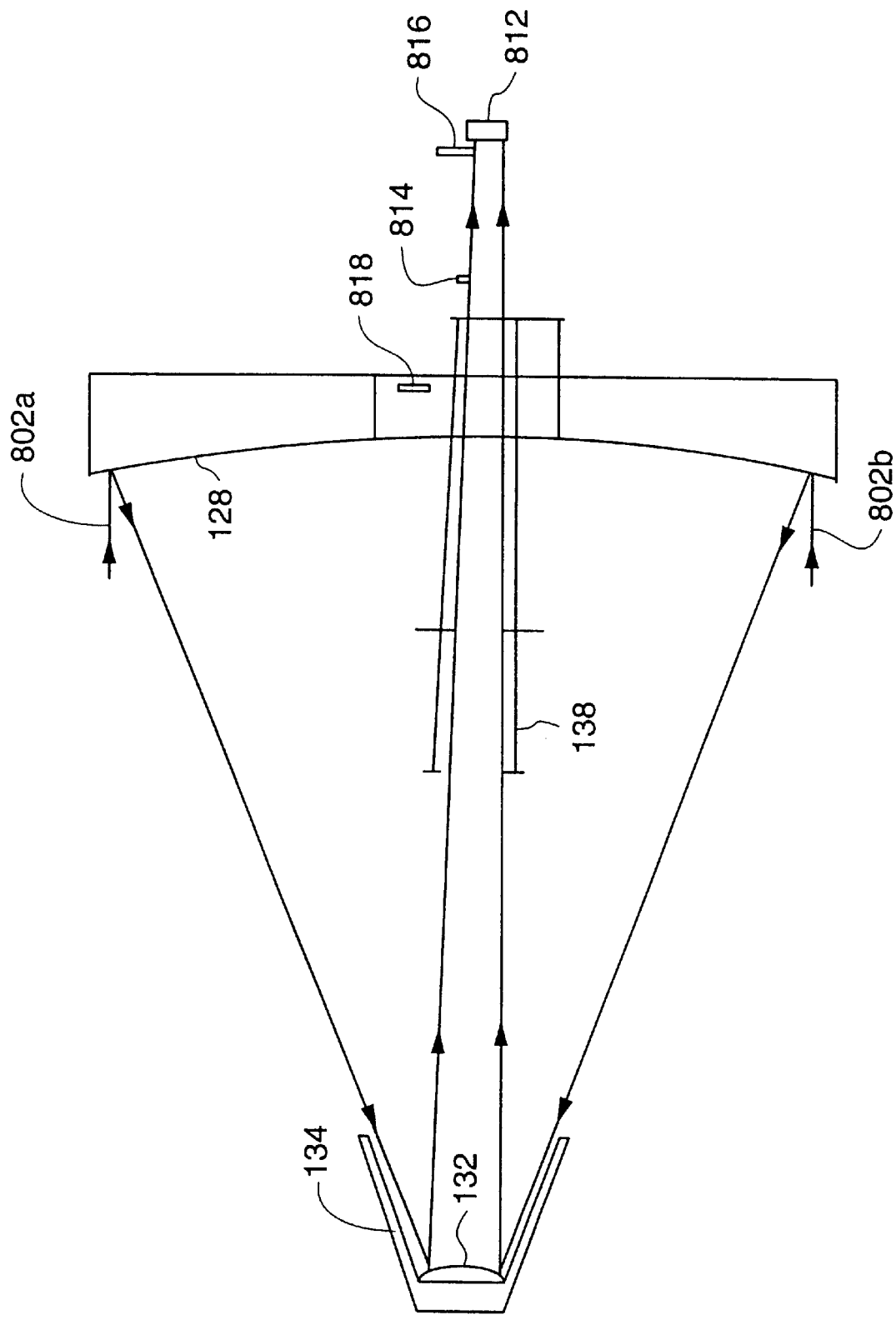
FIG. 8 is a schematic cross sectional view showing placement of primary, secondary and tertiary mirrors and certain optics from the optics module according to an embodiment of the present invention.

Although the folding and deployment apparatus and method described herein can be used in connection with a number of optical configurations, FIG. 8 depicts certain optics according to one embodiment of the present invention. In the depicted configuration, light 802a,b gathered by the primary mirror 128 is reflected by the secondary mirror 132 to a tertiary mirror 812 positioned in the optical module 142. The tertiary mirror 812 provides image light to a deformable mirror 814 which in a manner well known in the optics field, employs actuators (not shown) for wavefront correction. Corrected light from the deformable mirror 814 is provided to a fast steering mirror 816 which assists in maintaining the desired image centered. The image from the fast steering mirror is provided to a flat image plane e.g. for location of a roof mirror 818. Light from the flat image plane can be distributed to a number of types of optical instruments. In one embodiment, the instrument suite includes a near infrared (NIR) camera, a thermal infrared camera, a thermal infrared spectrometer, a near infrared multi-slit spectrometer, and a coronagraph.

In light of the above description, a number of advantages of the present invention can be seen. The present invention facilitates extra-atmospheric positioning (such as in earth orbit), of a large aperture telescope using a relatively small launch vehicle. A large aperture (6 to 8 meter, or larger diameter) segmented telescope with a fast primary mirror f/number (e.g. f/1.0 to f/2.5) is integrally designed with a science instrument suite and spacecraft platform. The instrument provides or enables a large field of view such as 1.2 mrad by 2.9 mrad. The fast f/number and pupil locations permit efficient packaging, and high signal-to-noise ratios. The segmented primary mirror is designed so that a majority of its mirror segments are usable without relying on deployment mechanisms which will position supplemental outer mirror panels.

The observatory can be used without requiring on-site service. A low-noise, low-temperature environment is provided or assisted by deployment of a sunshade device. The telescope can be operable without active cooling. The center of gravity of the observatory is positioned in or near the science instrument module to facilitate slewing separate from the spacecraft platform (bus). In the launch configuration, the supplemental outer mirror segments are stowed in a fashion to avoid blocking the main mirror, thus eliminating the risk of blocking in the case of deployment failure. The design is substantially scalable and can be implemented with little or no fundamental design modification in a number of different sizes.

In one embodiment, the primary mirror sections are substantially rigid, rather than deformable, and are coupled to actuators, such as three actuators per section for locating and maintaining the mirror sections in the desired position. Because useful data can be obtained even in the absence of light gathering by several mirror sections, the configuration is relatively tolerant of mirror actuator failures. Preferably, ⅔ of the actuators for a given mirror section can fail without destroying utility of the telescope as a whole (since such failure would, at worst, result in loss of light gathering power from one mirror section). In one embodiment, if up to two actuators of a given mirror section failed, the remaining actuator can be used to direct all light gathered by that mirror section away from the secondary mirror 132 to "dump" the light gathered by that mirror section (to avoid contaminating the image light gathered by the remaining sections).

A number of variations and modifications of the invention can be used; although one particular instrument suite has been described, the invention can be used in connection with a plurality of other astronomical instruments such as interferometers, photometers and phased arrays. Although a configuration which may be accommodated in the payload portion of an Atlas II launch vehicle has been described, the present invention can be used in connection with a telescope configured for smaller launch vehicles (e.g. a Delta II launch vehicle) or larger (e.g. Space Shuttle, Proton or Energia) launch vehicles. Although a configuration has been described in which full optical deployment is achieved with three pivoting movements, an operable space telescope can be provided employing more or fewer pivoting movements or with relative movements other than pivoting (such as linkages). Although a primary mirror formed from beryllium sections has been described, other primary mirror formation technologies can be used including metal, glass, ceramic or semi-conductor technologies.

Although the present invention has been described by way of a preferred embodiment and certain variations and modifications, other variations and modifications can also be used, the invention being defined by the following claims.

What is claimed is:

1. A telescope for placement in orbit, comprising:
   a primary reflector defining a first optical axis, said primary reflector having a main segment and first and second side segments;

a secondary reflector, coupled with respect to said main segment by at least a first arm, so as to be pivotable, about a first axis, from a launch configuration, with said arm substantially at an angle to said optical axis, to a deployed attitude, with said secondary reflector substantially on said optical axis;

said first and second side segments pivotable about second and third axes, respectively, from a launch configuration, defining planes substantially parallel to said optical axis, to a deployed attitude, substantially contiguous with said main segment;

wherein, complete deployment of telescope optical elements is achieved by said deployment of said secondary reflector and said side segments.

2. A telescope, as claimed in claim 1, configured, when in said launch configuration, to fit within the payload region of a launch vehicle having a payload diameter, and wherein said primary reflector, after deployment of said side segments, has a minimum deployed diameter greater than said payload diameter.

3. A telescope, as claimed in claim 2, wherein said payload diameter is about 3.6 meters and said minimum deployed diameter is at least about 6 meters.

4. A telescope, as claimed in claim 1, wherein said first axis is substantially perpendicular to said second and third axes.

5. A telescope, as claimed in claim 1, wherein said secondary reflector is coupled with respect to said main segment by said first arm and a second arm.

6. A telescope, as claimed in claim 5 wherein each of said first and second arms is substantially L-shaped.

7. A telescope, as claimed in claim 1 wherein said primary reflector comprises a first plurality of similarly-shaped mirror sections arranged substantially in a first annulus centered on said optical axis, and a second plurality of similarly-shaped sections arranged, when said primary reflector is deployed, in a second annulus, substantially surrounding said first annulus.

8. A telescope, as claimed in claim 7, wherein each of said first and second segments comprise portions of said second annulus.

9. A telescope, as claimed in claim 7, wherein said second annulus has eighteen mirror sections.

10. A telescope, as claimed in claim 9, wherein each of said first and second segments has 6 of said eighteen mirror sections of said second annulus.

11. A telescope, as claimed in claim 1, further comprising a bus having a longitudinal axis extending between a first latching end of said bus and a second solar end of said bus, said bus movable, with respect to said primary reflector, between a launch configuration with said optical axis spaced from said latching end, and a deployed configuration with said optical axis substantially adjacent said latching end.

12. A telescope, as claimed in claim 11, further comprising a sunshield system including a plurality of sheets movable, with respect to said bus, between a first launch configuration substantially parallel to the longitudinal axis of said bus and a second deployed configuration substantially perpendicular to the longitudinal axis of said bus.

13. A telescope, as claimed in claim 12, wherein a single motor is used to move all of said plurality of sheets from said first launch configuration to said second deployed configuration.

14. A telescope, as claimed in claim 12, further comprising a solar panel substantially defining a plane, wherein said sunshield system, when in said second deployed configuration, is between said plane defined by said solar panel and said primary reflector.

15. A telescope, as claimed in claim 14, further comprising an antenna movable between a first launch configuration, substantially in said plane defined by said solar panel, to a second deployed configuration, outward of said plane defined by said solar panel.

16. A telescope, as claimed in claim 1, further comprising a plurality of optical instruments positioned in an instrument volume substantially aligned with said optical axis, opposite a reflective surface of said primary reflector.

17. A telescope, as claimed in claim 16, having a center of gravity substantially within said instrument volume.

18. A method for deploying a space-based telescope, comprising:

providing a primary reflector defining a first optical axis, said primary reflector having a main segment and first and second side segments in a launch configuration defining planes substantially parallel to said optical axis;

providing a secondary reflector, coupled with respect to said main segment by at least a first arm in a launch configuration, with said arm substantially at an angle to said optical axis;

pivoting at least said first arm about a first axis to a deployed attitude to position said secondary reflector substantially on said optical axis;

pivoting said first and second side segments about second and third axes, respectively, to position said first and second side segments in deployed attitudes, substantially contiguous with said main segment.

19. A method, as claimed in claim 18, further comprising:

providing a bus having a longitudinal axis extending between a first latching end of said bus and a second solar end of said bus, in a launch configuration with said optical axis spaced from said latching end;

moving said bus, relative to said primary mirror, to a deployed configuration with said optical axis substantially adjacent said latching end.

20. A method, as claimed in claim 18, further comprising:

maintaining said longitudinal axis in a substantially constant direction with respect to at least a first stellar object; and moving said primary reflector, with respect to said bus, during said step of maintaining.

21. A method, as claimed in claim 19, further comprising:

providing a sunshield system including a plurality of sheets in a first launch configuration substantially parallel to the longitudinal axis of said bus;

moving said plurality of sheets, relative to said bus, to a second deployed configuration at an angle to the longitudinal axis of said bus.

22. A space-based telescope, comprising:

a primary reflector defining a first optical axis, said primary reflector having a main segment and first and second side segments in a launch configuration defining planes substantially parallel to said optical axis;

a secondary reflector, coupled with respect to said main segment by at least a first arm in a launch configuration, with said arm substantially at an angle to said optical axis;

means for pivoting at least said first arm about a first axis to a deployed attitude to position said secondary reflector substantially on said optical axis; and means for pivoting said first and second side segments about second and third axes, respectively, to position said first and second side segments in deployed attitudes, substantially contiguous with said main segment.

23. A telescope, as claimed in claim 22, configured, when in said launch configuration, to fit within the payload region of a launch vehicle having a payload diameter, and wherein said primary reflector, after deployment of said side segments, has a minimum deployed diameter greater than said payload diameter.

24. A telescope, as claimed in claim 23, wherein said payload diameter is about 3.6 meters and said minimum deployed diameter is at least about 6 meters.

25. A telescope, as claimed in claim 22, wherein said first axis is substantially perpendicular to said second and third axes.

26. A telescope, as claimed in claim 22, wherein said secondary reflector is coupled with respect to said main segment by said first arm and a second arm.

27. A telescope, as claimed in claim 26 wherein each of said first and second arms is substantially L-shaped.

28. A telescope, as claimed in claim 22 wherein said primary reflector comprises a first plurality of similarly-shaped mirror sections arranged substantially in a first annulus centered on said optical axis, and a second plurality of similarly-shaped sections arranged, when said primary reflector is deployed, in a second annulus, substantially surrounding said first annulus.

29. A telescope, as claimed in claim 28, wherein each of said first and second segments comprise portions of said second annulus.

30. A telescope, as claimed in claim 28, wherein said second annulus has eighteen mirror sections.

31. A telescope, as claimed in claim 30, wherein each of said first and second segments has 6 of said eighteen mirror sections of said second annulus.

32. A telescope, as claimed in claim 22, further comprising a bus having a longitudinal axis extending between a first latching end of said bus and a second solar end of said bus, said bus movable, with respect to said primary reflector, between a launch configuration with said optical axis spaced from said latching end, and a deployed configuration with said optical axis substantially adjacent said latching end.

33. A telescope, as claimed in claim 32, further comprising a sunshield system including a plurality of sheets movable, with respect to said bus, between a first launch configuration substantially parallel to the longitudinal axis of said bus and a second deployed configuration substantially perpendicular to the longitudinal axis of said bus.

34. A telescope, as claimed in claim 33, wherein a single motor means is used to move all of said plurality of sheets from said first launch configuration to said second deployed configuration.

35. A telescope, as claimed in claim 33, further comprising a solar panel substantially defining a plane, wherein said sunshield system, when in said second deployed configuration, is between said plane defined by said solar panel and said primary reflector.

36. A telescope, as claimed in claim 35, further comprising an antenna movable between a first launch configuration, substantially in said plane defined by said solar panel, to a second deployed configuration, outward of said plane defined by said solar panel.

37. A telescope, as claimed in claim 22, further comprising a plurality of optical instruments positioned in an instrument volume substantially aligned with said optical axis, opposite a reflective surface of said primary reflector.

38. A telescope, as claimed in claim 37, having a center of gravity substantially within said instrument volume.

* * * * *